April 12, 1960    J. H. MILLINGTON    2,932,376
AUTOMATIC TRANSFER UNIT
Filed Feb. 26, 1958    6 Sheets-Sheet 1

INVENTOR.
JOHN H. MILLINGTON.
BY
ATTORNEY.

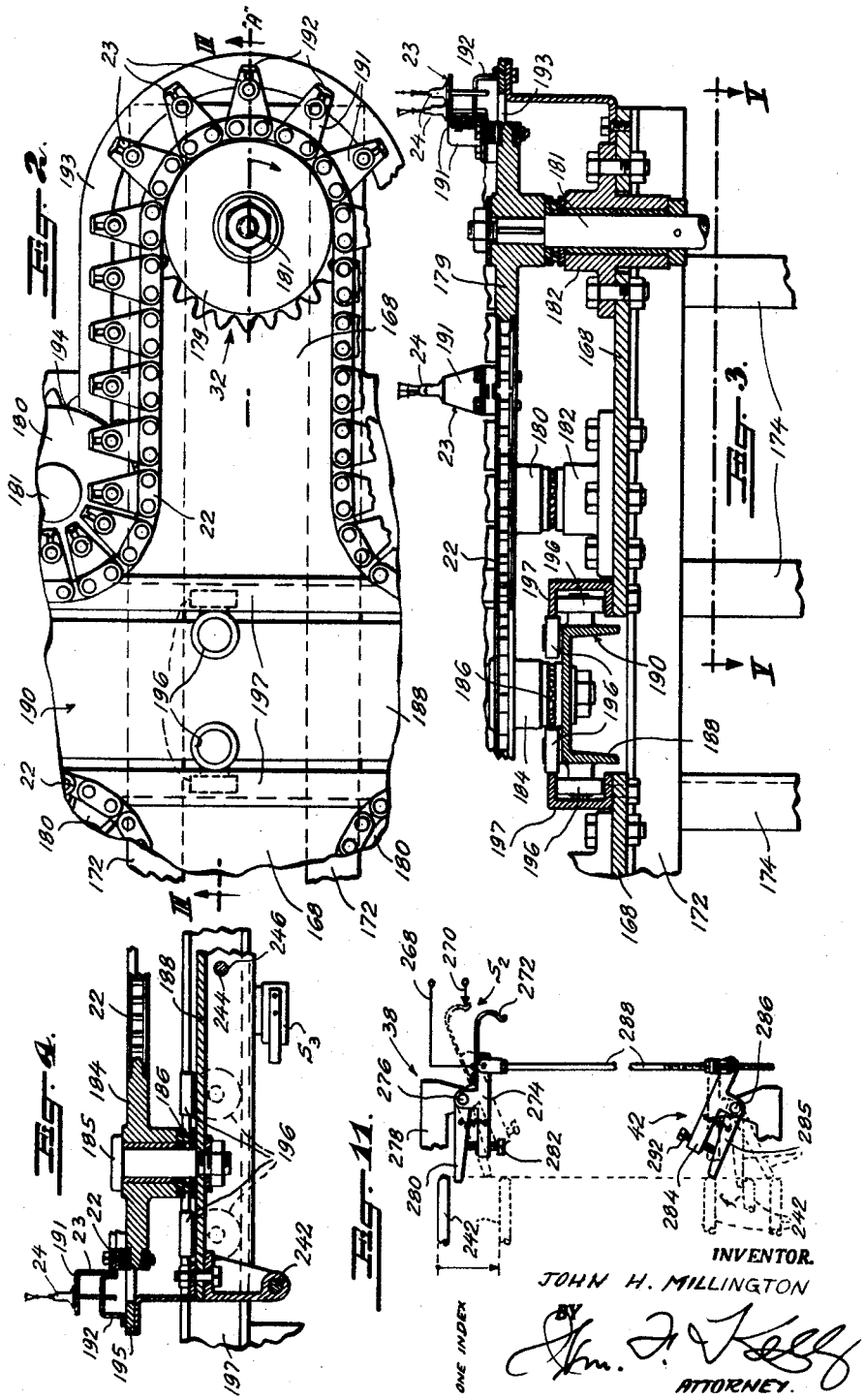

April 12, 1960   J. H. MILLINGTON   2,932,376
AUTOMATIC TRANSFER UNIT
Filed Feb. 26, 1958   6 Sheets-Sheet 3
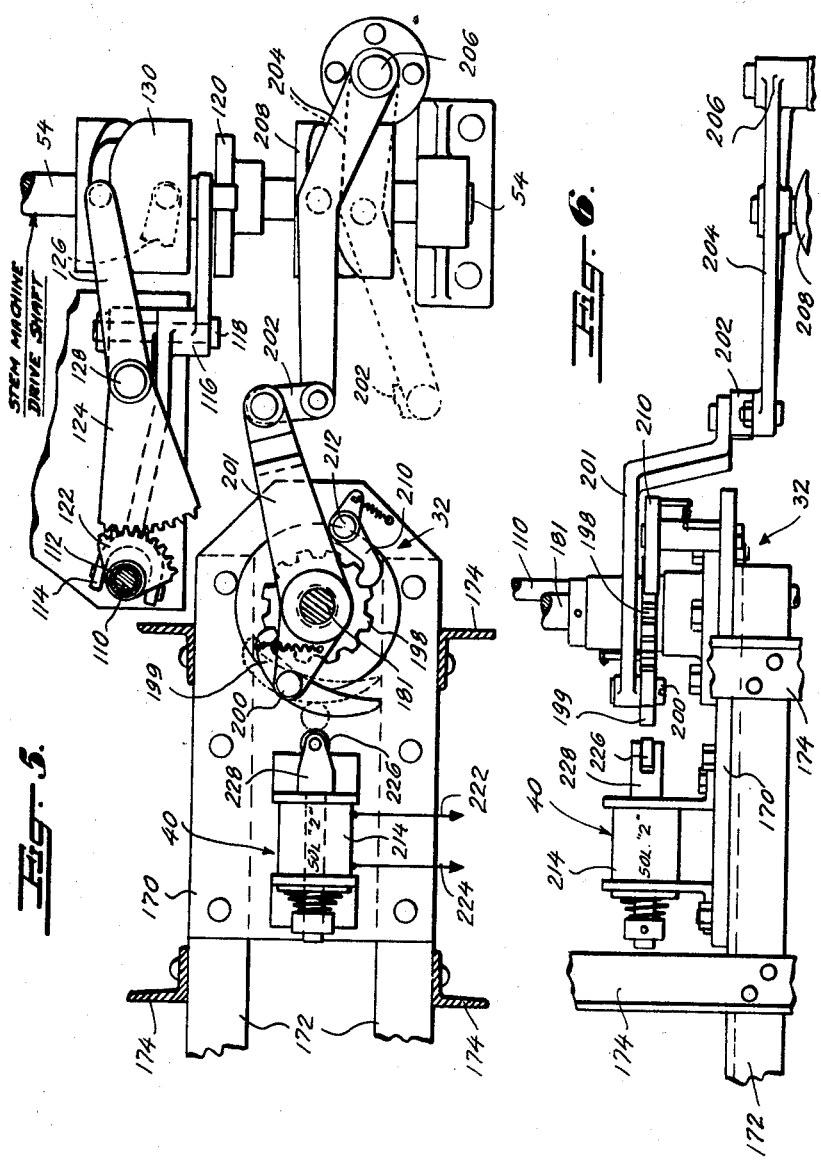
INVENTOR.
JOHN H. MILLINGTON
ATTORNEY.

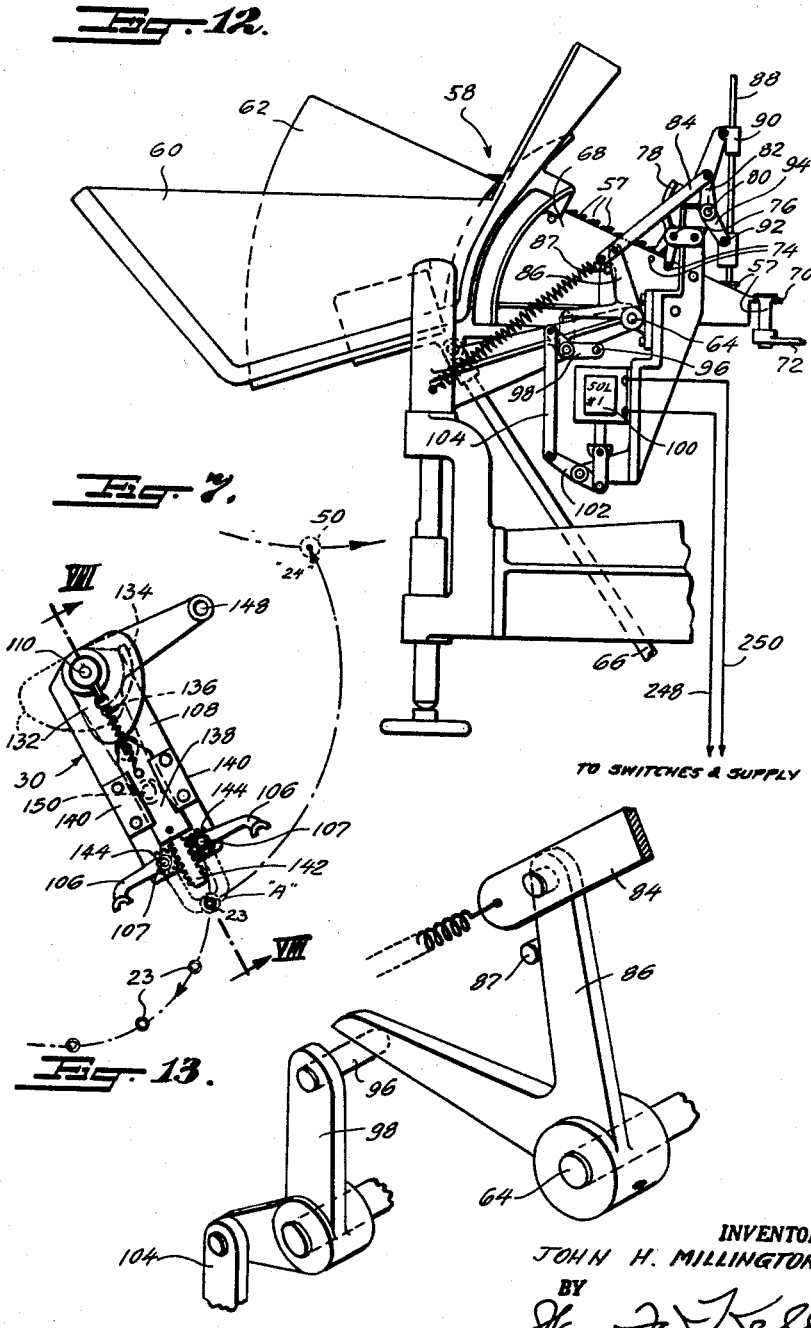

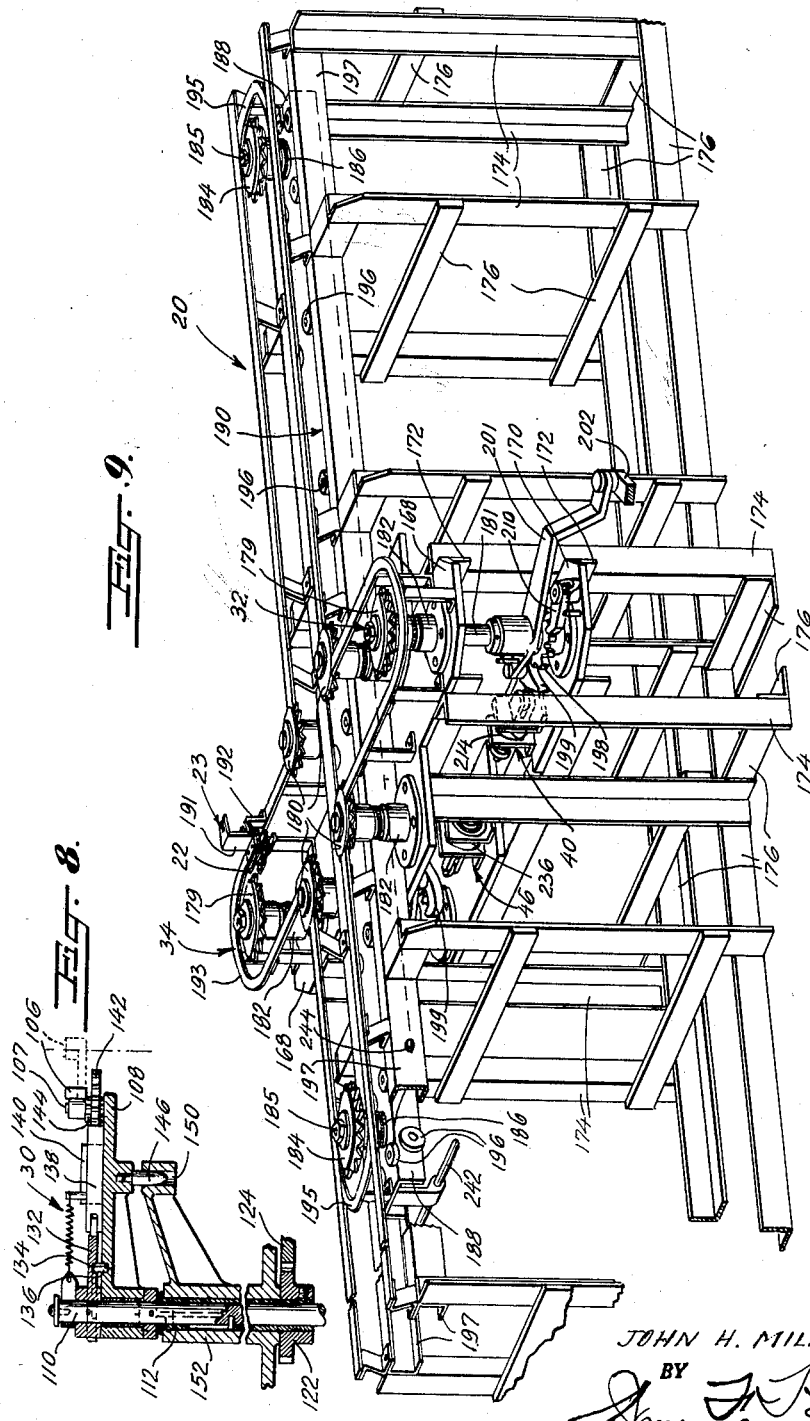

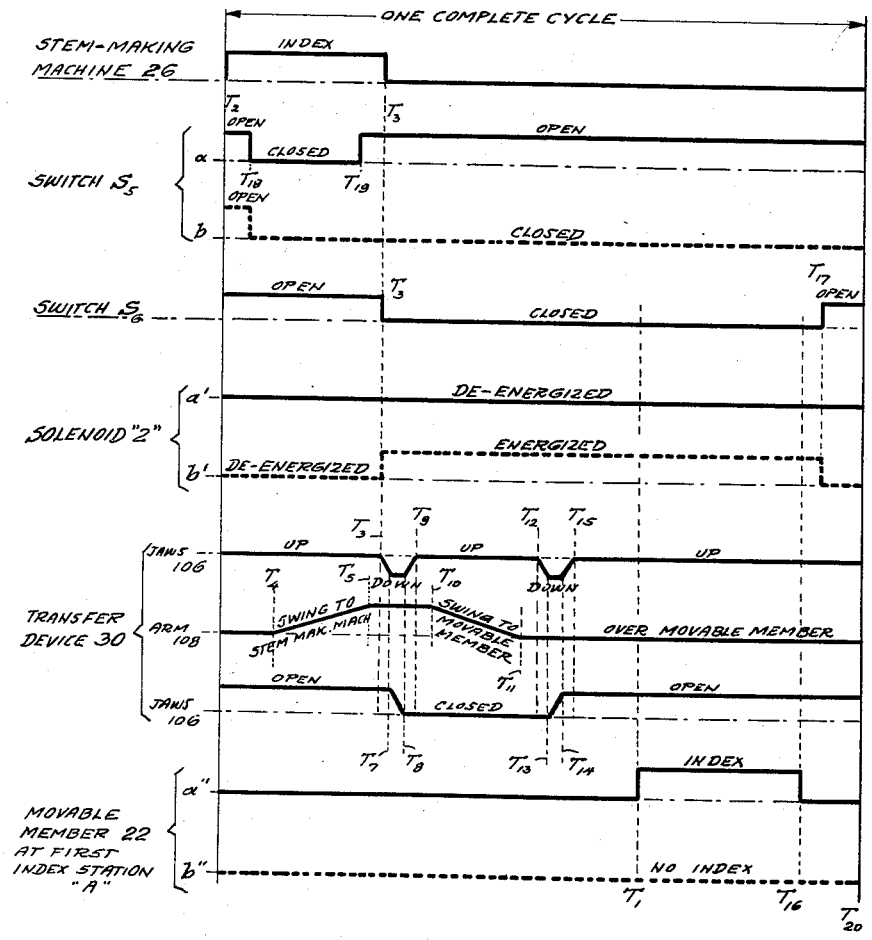
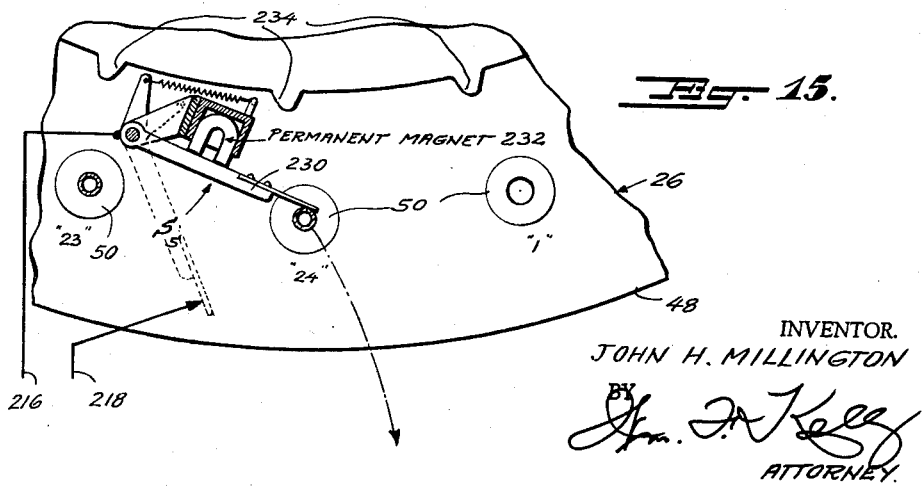
INVENTOR.
JOHN H. MILLINGTON

United States Patent Office 2,932,376
Patented Apr. 12, 1960

2,932,376

AUTOMATIC TRANSFER UNIT

John H. Millington, Pittsburgh, Pa., assignor to Westinghouse Electric Corporation, East Pittsburgh, Pa., a corporation of Pennsylvania Application February 26, 1958, Serial No. 717,691

31 Claims. (Cl. 198—19)

The present invention relates to a transfer unit for automatically transferring work pieces from one machine to another. This application is a continuation-in-part of my copending application Serial Number 601,447, filed August 1, 1956, now abandoned, entitled "Automatic Transfer Device" and assigned to the same assignee as the present application.

Heretofore, the synchronized transfer of work between machines has been accomplished by employing a common drive between the machines and the transfer unit. Where synchronization of the machines and the transfer unit is impractical and where full mechanical control over the work piece orientation is required, a satisfactory automatic transfer unit between non-synchronous machines has heretofore not been available.

It is the general object of this invention to avoid and overcome the foregoing and other difficulties of and objections to prior art practices by the provision of the automatic transfer of work pieces from one machine to another even though they may be operating at different rates of speed and hence at different rates of work output.

A specific object of the present invention is the automatic transfer of work pieces between non-synchronous automatic incandescent or discharge lamp manufacturing machines.

Other objects of the invention will become apparent to those skilled in the art to which it appertains as the description proceeds both by direct recitation thereof and implication from the context.

The aforesaid objects of the invention, and other objects which will become apparent as the description proceeds are achieved by providing a movable member or conveyor, such as a chain, for conveying articles from a first machine operated at one rate of output to a second machine operated at another rate of output, for example, a lower rate. The movable member is, at one point or first index station in its path of movement, driven in synchronism with the first machine and with a transfer device which transfers articles from the first machine to the movable member at the first index station. At a second point or index station, the movable member is driven synchronously with the second machine and also with a second transfer device which transfers articles from the movable member at the second index station to the second machine. Due to the greater rate of output of the first machine, the portion of the movable member moving from the first to the second index station gradually increases in length and the remaining portion gradually decreases in length. A mechanism is provided which operates in response to one or both of these changes in length to temporarily interrupt the transfer of articles to and the movement of the movable member at the first index station. Delivery of articles from the movable member to the second machine gradually restores the portions of said movable member to approximately their previous lengths, after which transfer of articles to and movement of the movable member at the first index station are resumed. By continuously repeating the cycle, the output of the first machine is, over a period of time balanced with the output of the second machine.

For a better understanding of the invention reference should be had to the accompanying drawings, wherein like numerals of reference indicate similar parts throughout the several views and wherein:

Fig. 2 is a fragmentary plan view of the transfer unit showing particularly the details of the sprocket adjacent the stem-making machine, and the work-transferring movable member and portions of the carriage of the transfer unit.

Fig. 3 is a vertical-sectional view of the portions of the transfer unit taken along the line III—III of Fig. 2 in the direction of the arrows.

Fig. 4 is a fragmentary vertical-sectional view of the lower portion of the movable member and the carriage of the transfer unit taken along the line IV—IV of Fig. 1 in the direction of the arrows.

Fig. 5 is a horizontal-sectional view along the line V—V of Fig. 3 in the direction of the arrows and showing the drive for the transfer device which operates between the stem-making machine and the transfer unit and also the drive for the transfer unit disposed adjacent the stem-making machine.

Fig. 6 is a side elevational view of the mechanism shown in Fig. 5.

Fig. 7 is a plan view of the transfer device for transferring stems from the stem-making machine to the transfer unit, and showing the transfer device in the lowermost position adjacent a head of the transfer unit and with its jaws in the open position.

Fig. 8 is a fragmentary vertical-sectional view taken on the line VIII—VIII of Fig. 7 and looking in the direction of the arrows.

Fig. 9 is a perspective view of the transfer unit and showing for the sake of clarity only a portion of the movable member and one of the work-piece carrying heads.

Fig. 11 is an enlarged plan view of a second switch for causing the interruption of the operation of a flare-feeding device and an associated tripping mechanism for causing the termination of this interruption at the desired time in the operating cycle.

Fig. 12 is a side-elevational view of the flare-feeding device for feeding flares to the stem-making machine and showing the means for automatically interrupting the feeding of the flares of said stem-making machine.

Fig. 13 is an enlarged perspective view of a portion of the means for interrupting the feeding of the flares to the stem-making machine and shown in the position where a restraining rod of the flare-feeding device is locked to prevent feeding of the flares.

Fig. 14 is a diagrammatic view illustrating the sequence of operations in the transfer of a stem from the stem-making machine to the transfer unit.

Fig. 15 is an enlarged fragmentary plan view of a detecting switch at the discharge station of the stem-making machine, the magnetic means for holding the switch in the positive detecting or open position and the cam means carried by the turret of the stem-making machine for returning the switch to its normally closed position.

Although the principles of the invention are broadly applicable to the transfer of articles from an article-feeding unit to an article-receiving unit, the invention is particularly adapted for use in conjunction with a stem-making machine and a sealing and exhaust machine for the manufacture of neon glow lamps and hence it has been so illustrated and will be so described.

Figure 1:
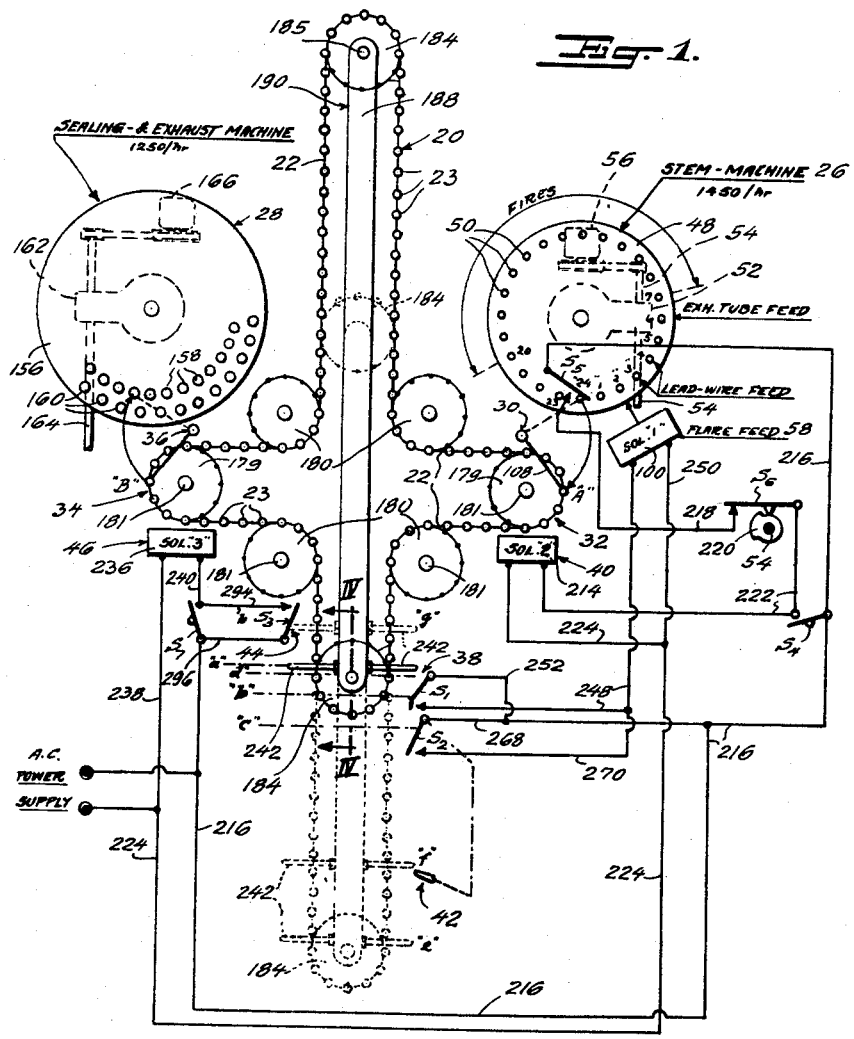
Fig. 1 is a diagrammatic plan view of a lamp manufacturing group comprising a stem-making machine, a sealing and exhaust machine, a transfer unit and the associated transfer devices.

With specific reference to the form of the invention illustrated in the drawings, and referring particularly to Figs. 1 and 9, the numeral 20 indicates generally a transfer unit of the present invention having a movable member or conveyor 22 for conveying articles, such as stems 24 (Figs. 3 and 4) from a stem-making machine 26 to a sealing and exhaust machine 28. The stem-making machine is of the type shown in U.S. Patent No. 2,252,195, issued August 12, 1941, to E. Niles and is operated at a rate of output of about 1450 stems 24 per hour. The sealing and exhaust machine 28 is of the type shown in U.S Patent No. 2,162,209, issued June 12, 1939, to D. G. Trutner and is operated at another rate of output, for example, about 1250 exhausted lamps per hour. This movable member 22, provided with a plurality of stem-receiving heads 23 for example one hundred four in the showing of Fig. 1, is at one point or first index station "A" (Fig. 1) in its path of movement, driven in synchronism with the stem-making machine 26 and with a first transfer device 30 (Figs. 7 and 8) by a first drive means 32 (Fig. 5). The transfer device 30 is of the type shown in U.S. Patent No. 1,813,565, issued July 7, 1931, to R. W. Conn, and transfers the stems 24 from the stme-making machine 26 to the movable member 22 at this first index station "A." At a second point or index station "B," the movable member 22 is driven synchronously with the sealing and exhaust machine 28 and also with a second transfer device 36 (identical to the first transfer device 30) by a second drive means 34 (Fig. 9) which transfer device 36 transfers stems 24 from the movable member 22 at a second index station "B" to the sealing and exhaust machine 28.

Due to the greater rate of output of the stem-making machine 26, the portion of the movable member 22 moving from the first index station "A" to the second index station "B" gradually increases in length and the remaining portion gradually decreases in length. To provide means which operates in response to one or both of these changes in length of the movable member 22 for the purpose of temporarily interrupting the transfer of stems 24 to (and the movement of the movable member 22 at) the first index station "A," a first control means 38 is connected to a first operating mechanism 40 which prevents the operation of the first drive means 32 for the movable member 22 at the first index station "A."

The transfer of the stems 24 at the second index station "B" from the movable member 22 to the sealing and exhaust machine 28 and the attendant movement of the movable member 22 at the second index station "B" gradually restores the intermediate portions of the movable member 22 to their previous lengths and actuates a mechanism 42 for terminating the interruption of the movement of the movable member 22 at the first index station "A" and the transfer of stems 24 from the stem-making machine 26 to the movable member 22. For the purpose of providing means which operates in response to a decrease in length in the portion of the movable member 22 moving from the first index station "A" to the second index station "B" (due to a breakdown of the stem-making machine 26) to temporarily interrupt the transfer of stems 24 at the second index station "B" from the movable member 22 to the sealing and exhaust machine 28, a second control means 44 is connected to a second operating mechanism 46 which in turn is operatviely associated with the second drive means 34 (Fig. 9) to prevent indexing of the movable member 22 at the second index station "B."

Since the stem-making machine 26, first transfer device 30, sealing and exhausting machine 28 and second transfer device 36 of the manufacturing group of the present invention are conventional and per se forms no part of the present invention, it is deemed advisable to briefly describe the structure and operation of each in the order indicated above before proceeding with a detailed description of the transfer unit 20 of the present invention.

*Stem-making machine*

The stem-making machine 26 (Fig. 1) of the type shown in the above-mentioned U.S. Patent No. 2,252,195 comprises essentially a turret 48 provided with a plurality of, for example twenty-four, stem-fabricating heads 50 indexable through a like number of work stations by a conventional indexing mechanism 52, of the type shown in U.S. Patent No. 2,569,852, issued October 2, 1951, to J. H. Greene. To provide drive means for the indexing mechanism 52, the latter is connected to a main drive shaft 54 driven through a suitable belt by a motor 56.

At station "2" of the stem-making machine 26 a flare 57 (Fig. 12) is fed to a stem-fabricating head 50 by a flare-feeding device 58 (Fig. 12) of the type shown in U.S. Patent No. 1,597,439, issued August 24, 1926, to J. T. Fagan. If a flare 57 is in the head 50, lead wires are fed to the stem-fabricating head 50 at stations "3" and "4" and a tubulation inserted into the head 50 at station "6." From stations "7" through "20" sealing fires, indicated diagrammatically in Fig. 1, heat the flare 57 and tubulation preparatory for a first and second press molding operation (not shown) and the formation of the stem 24. At stations "20" through "24" the stem 24 is permitted to cool in the atmosphere. For the purpose of detecting the absence of a stem 24 a station "24" and preventing the indexing of the movable member 22 of the transfer unit 20 at the first index station "A" at time $T_1$ (Fig. 14), a normally closed switch $S_5$ (Figs. 1 and 15) is disposed adjacent station "24," the stem-discharge station, and is opened by a stem 24 indexing thereinto. This opening of the switch $S_5$ which forms a part of the first control means 38 (Fig. 1) prevents energization of the first operating mechanism 40 for interrupting the operation of the first drive means 32 (for indexing the movable member 22 at the first index station "A") with the result that such first drive means 32 will continue to operate so long as stems 24 in the heads 50 continue to be indexed to position "24."

*Flare-feeding device*

Since the conventional flare-feeding device 58 (Figs. 12 and 13) is of the type shown in the above-mentioned U.S. Patent No. 1,597,439, it is deemed sufficient to briefly describe its operation. A quantity of flares 57 are disposed in a hopper 60 having a slot in the bottom thereof and through which a slotted segment 62 pivoted at 64 is moved upwardly to pick up flares 57 in its slotted upper surface and align the loaded upper surface with a chute 68 in the position shown in Fig. 12. This upward movement is imparted to the segment 62 by a connecting rod 66 driven by cam means (not shown) on the main drive shaft 54 of the stem-making machine 26. The flares 57 gravitate down the chute 68 toward an unloading lip 70 and toward open flare-receiving jaws 72 of a stem-fabricating head 50 of the stem-making machine 26 disposed beneath the lip 70 at station "2" thereof.

To provide an escapement mechanism and permit the flares 57 to gravitate one at a time down the delivery end of the chute 68, as viewed in Fig. 12, a pair of pins 74 mounted on arms depending from a rod 76 are alternately insertable into suitable holes in the chute 68 by movement of a cam 78 against the rod 76. Insertion of the right-hand pin 74, as viewed in Fig. 12, in its registering hole during the upward movement of the segment 62 holds back the line of flares 57. Withdrawal of the right-hand pin 74 and insertion of the left-hand pin 74 into its registering hole during the lowering of the segment 62 releases the leading flare 57 on the chute 68 and restrains the remaining flares 57. For the purpose of coordinating the above-described movements of the pins 74 with the raising and lowering of the segment 62, the cam 78 is mounted on a shaft 80 connected by an arm 82, and a link 84 to a bell-crank lever 86 on the pivot 64 for the segment 62. The lever 86 is spring-biased counterclockwise against a stop 87 carried by the segment 62. Thus, clockwise or upward movement of the segment 62, as viewed in Fig. 12, causes similar movement of the cam 78 and attendant insertion of the right-hand pin 74. Counterclockwise or lowering movement of the segment 62 results in counterclockwise movement of the cam 78 and resultant withdrawal of the right-hand pin 74 and insertion of the left-hand pin 74.

In order to prevent crowding of the leading flare 57 on the unloading lip 70 by the next flare 57 which moves toward the unloading lip 70 and to thereby permit closing of the jaws 72 about the leading flare 57, a restraining rod 88 is reciprocable in a sleeve 90 which is pivotably mounted at 92 on an arm 94 affixed to the shaft 80. This restraining rod 88 is swung clockwise, as viewed in Fig. 12, into engagement with the leading flare 57 simultaneous with the next insertion of the right-hand pin 74 into its registering hole and the raising of or clockwise movement of the segment 62, as viewed in Fig. 12. During the withdrawal of the right-hand pin 74, as viewed in Fig. 12, and the lowering of the segment 62 the restraining rod 88 is swung counterclockwise to permit the now leading flare 57 to gravitate onto the unloading lip 70 and into the now open jaws 72 of the next head 50 at station "2" of the stem-making machine 26.

As it is desirable at certain predetermined times in the operation of the transfer unit 20 of the present invention to interrupt the feeding of the flares 57 to the head 50 of the stem-making machine 26 by locking the restraining rod 88 in the "down" or flare-engaging position shown in Fig. 12, a detent 96 carried by a bell-crank lever 98 is movable counterclockwise, as viewed in Fig. 12, into engagement with the lower arm of the lever 86 to lock the lever 98 in this position. This locking movement of the detent is achieved by energization of a solenoid 100, also indicated by the legend "Sol. 1" in Figs. 1 and 12, and resultant counterclockwise rotation of a lever 102 secured to the armature of the solenoid 100 and attendant downward movement of a link 104 connecting the levers 98 and 102.

*Transfer device*

Since the first transfer device 30 (Figs. 1, 5, 7 and 8) for transferring a stem 24 from the stem-making machine 26 to the transfer unit 20 is similar to the second transfer device 36 (Fig. 1) for transferring the stem to the sealing and exhausting machine 28 and both are of the type shown in the above-mentioned U.S. Patent No. 1,813,565, it is deemed sufficient to briefly describe the first transfer device 30 shown more in detail in Figs. 5, 7 and 8.

The first transfer device 30 has a pair of jaws 106 pivoted at 107 on an arm 108 which is journalled on a shaft 110. This shaft 110 is in turn keyed to a sleeve 112 and is hence reciprocable in and rotatable with the latter. At time $T_2$ (Fig. 14), the beginning of the index period ($T_2$—$T_3$) of the stem-making machine 26, the jaws 106 are open and disposed above a head 23 at the first index station "A" in the position shown in Figs. 1 and 7. From time $T_4$ to time $T_5$ the arm 108 and the open jaws swing 90° counterclockwise from the position shown in Figs. 1 and 7 to a position above a head 50 of the stem-making machine 26.

The open jaws 106 are next lowered and juxtaposed around the stem 24 in the head 50 during the time interval $T_3$—$T_7$ and then closed about the stem in the period $T_7$—$T_8$. The arm 108, with a stem 24 held in closed jaws 106, is elevated to the "up" position above the now empty head 50 during the period $T_8$—$T_9$ and rotated clockwise, as viewed in Fig. 7, to a position similar to that shown in Fig. 7 from time $T_{10}$ to time $T_{11}$. The arm 108 with its jaws 106 is then lowered to insert the stem 24 in a head 23 of the movable member at the first index station "A" (Figs. 1 and 7) during the interval $T_{12}$—$T_{13}$ whereupon the jaws 106 are opened ($T_{13}$—$T_{14}$), and retracted upwardly to the position shown in Fig. 7 during the time $T_{14}$—$T_{15}$.

To provide a reciprocating mechanism for raising and lowering the shaft 110 and hence the arm 108 at station "24" of the stem-making machine 26 and at the first index station "A" of the movable member 22, a yoke 114 (Fig. 5) on the end of a bell-crank lever 116, is secured to the shaft 110. The lever 116 is pivoted at 118 and is driven by a cam 120 on the main drive shaft 54 of the stem-making machine 26. Thus, a raised portion and lowered portion of the cam 120 will cause raising and lowering respectively of the shaft 110 and the arm 108, as viewed in Fig. 8, at the above-described times (i.e. $T_8$—$T_9$, $T_{14}$—$T_{15}$ and $T_3$—$T_7$, $T_{12}$—$T_{13}$ respectively, Fig. 14).

For the purpose of oscillating the arm 108 on the shaft 110 between the solid line position shown in Fig. 7 and the position above station "24" of the stem-making machine 26, a segmental pinion 122 secured to the sleeve 112 (Fig. 8) meshes with a toothed segment member 124 (Fig. 5) of a lever 126 pivoted at 128 and oscillatable by a cam 130 on the main drive shaft 54. Clockwise and counterclockwise rotation of the toothed segment member 124, when viewed in Fig. 5, causes counterclockwise and clockwise rotation respectively of the arm 108, as viewed in Fig. 7.

In order to open and close the jaws 106 at the above mentioned desired times $T_{13}$—$T_{14}$ and $T_7$—$T_8$ respectively (Fig. 14), a cam 132 (Figs. 7 and 8) is secured to the shaft 110 and provided with an arcuate slot 134 in which a pin 136 upstanding from the arm 108 is disposed. This slot 134 permits further rotation of the cam 132 with the shaft 110 when the arm 108 ceases to rotate. The cam 132 is employed to reciprocate both a slide block 138 movable in suitable guides 140 on the arm 108 and a double rack 142 carried by the slide block 138 to thereby rotate a pair of gears 144 each secured to the pivot 107 on which a jaw 106 is disposed. For the purpose of limiting the rotation of the arm 108 after the latter is lowered at station "24" of the stem-making machine 26 and at the first index station "A" of the movable member, a pin 146 (Fig. 8) depending from the arm 108 is inserted into sockets 148 and 150 provided in stationary arms 152 and 154 angularly disposed relative to each other and aligning with the arm 108 when at the above-mentioned respective stations. The jaws 106 are either closed or opened by the continued rotation of the cam 132 (even after the arm 108 ceases to rotate) depending on the direction of the rotation thereof.

*Sealing and exhaust machine*

The sealing and exhaust mechaine 28 (Fig. 1) of the type shown in the above-mentioned U.S. Patent No. 2,162,209 comprises essentially a sealing and exhaust turret 156 provided with a plurality of concentrically arranged sealing heads 158 and exhaust heads 160, for example thirty-six each. These heads 158 and 160 are indexed through a like number of work stations by a conventional indexing mechainsm 162 of the type shown in the above-mentioned U.S. Patent No. 2,569,852. In order to provide drive means for the indexing mechanism 162, the latter is connected to a main drive shaft 164 of the sealing and exhaust machine 28, which shaft is driven through a suitable belt by a motor 166.

The second transfer device 36, also indicated in Fig. 1 is connected to and driven by the main drive shaft 164 of the sealing and exhausting machine 28 in the same manner as the above-described first transfer device 30 (Figs. 5, 7 and 8) is driven by the main drive shaft 54 of the stem-making machine 26.

Having briefly described the structure and operation of the conventional apparatus associated with the transfer unit 20 (Figs. 1–6, 9 and 10) to form the complete manufacturing apparatus of the present invention, the transfer unit 20 of the present invention will now be described in detail.

Transfer unit 20

To provide a supporting frame for the transfer unit 20 (Figs. 1–6, 9 and 10) upper and lower mounting plates 168 and 170 respectively are affixed to channel members 172 secured to legs 174 upstanding from bed plate members 176. The legs 174 in turn are integrated by tie members 176.

For the purpose of supporting the aforementioned movable member 22 in its path of movement from the first index station "A" to the second index station "B" and back again to the former station, a pair of driven guide members 179 and a plurality of idler guide members 180 (Figs. 1 and 9) are fixed to shafts 181 rotatable in shiftable bearings 182 upstanding from the upper mounting plate 168. The variable length intermediate portions of the movable member 22 are additionally supported by a pair of guide members 184 mounted on shafts 185 rotatable in bearings 186 which are disposed in spaced relation on a longitudinal channel member 188 of a carriage 190.

To support each of the stem-receiving heads 23 (Figs. 2–4) which comprise a Z-like plate 191, as viewed in Figs. 3 and 4, secured to the movable member 23 by the individual link pins and apertured to permit passage of the stem tubulation therethrough, each head 23 is provided with an outwardly extending runner 192 which rides on a peripheral stationary track 193, a movable track 194 affixed to the idler guide members 180, and a stationary track 195 disposed on the channel member 188 of the carriage 190 about the guide members 184.

In order to drive the movable member 22 at the first index station "A" and at the second index station "B" at the rate of output of the stem-making machine 26, namely 1450 indexes per hour and at the rate of output of the sealing and exhaust machine 28, namely 1250 indexes per hour, respectively, the right and left-hand guide members 179, as viewed in Figs. 1 and 9, are connected to the first drive means 32 and second drive means 34 respectively, as hereinafter related. The carriage 190 is movable on rollers 196 along a pair of longitudinal guide channels 197 by the portions of the movable member 22 intermediate the first and second index stations "A" and "B" (as they lengthen and shorten) to compensate for the difference in the rates of movement of the movable member at the first and second index stations "A" and "B." These guide channels 197 are secured to the upper mounting plate 168 transverse thereto and are additionally supported by the legs 174.

Drive means for the movable member

Since the first drive means 32 (Figs. 1, 5 and 6) is connected to the stem-making machine 26 and the right-hand guide member 179, as viewed in Figs. 1 and 9, in the same manner as the second drive means 34 is associated with the left-hand guide member 179 and the sealing and exhaust machine 28, it is deemed sufficient to only described the structure and operation of the first drive means 32 and its associated first operating mechanism 40, but it will be understood that such description equally applies to the second drive means 34.

To index the right-hand guide member 179, as viewed in Figs. 1 and 9 and shown in Figs. 5 and 6, at the same rate as the rate of output of the stem-making machine 26, namely 1450 indexes per hour, a ratchet wheel 198 is fastened to shaft 181 which carries the right-hand member 179 and is engageable by an advancing pawl 199 pivoted at 200 on a lever 201 which is freely rotatable on the shaft 181. This advancing pawl 199 is spring-biased into engagement with the ratchet wheel 198, and the lever 201 is connected by a link 202 to a cam lever 204, pivoted at 206. The cam lever 204 is driven by an indexing barrel cam 208 on the main drive shaft 54 of the stem-making machine 26. In order to hold the ratchet wheel 198 in its advanced position after each index, while the advancing pawl 199 is retracted, a holding pawl 210 is pivoted at 212 and is spring biased into engagement with the ratchet wheel 197.

Thus, at time $T_1$ (Fig. 14) the indexing cam 208 begins to move the cam lever 204 counterclockwise, as viewed in Fig. 5, from the solid-line position shown therein to the dotted-line position in such figure to move the ratchet wheel 198 clockwise. This clockwise movement of the ratchet wheel 198 indexes the loaded stem-receiving head 23 on the movable member 22 out of the first index station "A" and indexes an empty head 23 thereinto. The indexing movement is completed at time $T_{16}$ (Fig. 14).

Movement of the cam lever 204 in clockwise direction from the dotted-line position shown in Fig. 5 to the solid-line position shown therein retracts the advancing pawl 199 in counterclockwise direction with respect to the ratchet wheel 198 which is held in the advanced position by the holding pawl 210, preparatory for the next index of the movable member 22.

Operating mechanisms for interrupting movement of the movable member 22

The first operating mechanism 40 comprises a solenoid 214, identified by the legend "Sol. 2" in Figs. 1, 5 and 6, disposed on the lower mounting plate 170 adjacent the advancing pawl 199 and operable to disengage the advancing pawl 199 from the ratchet wheel 198 to prevent indexing of the movable member 22 at the first index station "A". The solenoid 214 has its operating coil (not shown) connected in a first circuit (Fig. 1) for preventing the indexing of the movable member 22 at the first index station "A." This first circuit is energized when a stem 24 is absent from a stem-fabricating head 50 at station "24" of the stem-making machine 26, which absence is indicated by switch $S_5$ failing to open when an empty head 50 indexes into station "24" during the period $T_2$—$T_3$ (Fig. 14).

This first circuit for preventing the indexing of the movable member 22 at the first index station "A" includes a line conductor 216 extending from one side of a power supply, indicated by the legend "A.C. Power Supply" (Fig. 1), to one side of the normally-closed switch $S_5$; a conductor 218 connecting the other side of the switch $S_5$ to one side of a cam-operated switch $S_6$ for preventing needless energization of the solenoid 214 during the index period $T_2$—$T_3$ (Fig. 14) of the stem-making machine 26 and a conductor 222 extending from the other side of the switch $S_6$ to one end of the coil (not shown) of the solenoid 214. The switch $S_6$ is operated by a cam 220 on the main drive shaft 54 of the stem-making machine 26. The first circuit is completed by a line conductor 224 joining the other end of the coil of the solenoid 214 to the other side of the power supply.

At the start of the index period $T_2$—$T_3$ of the stem-making machine 26, a movable arm 230 of the switch $S_5$ is held in the solid-line position shown in Fig. 15 by a stationary permanent magnet 232. As a stem 24 in the stem-fabricating head 50 of the stem-making machine 26 at station "23" indexes into station "24," the switch $S_6$, opened at time $T_{17}$ (Fig. 14) by the cam 220, is held open thereby until time $T_3$ to prevent closure of the first circuit which would otherwise undesirably prevent the indexing of the movable member 22. At time $T_{18}$ (line "a" Fig. 14) cam means 234 on the turret 48 causes movement of the movable arm 230 from the solid-line position shown in Fig. 15 to the dotted-line position shown therein, thereby momentarily closing the switch $S_5$. At time $T_{19}$ (line "a" Fig. 14) the stem 24 engages the arm 230 moving the latter from the dotted line position (Fig. 15) to the solid-line position, thereby opening switch $S_5$. The arm 230 is held in this solid-line position by the magnet 232 until the time $T_{18}$ on the next cycle when the cam means 234 again causes movement of the arm 230 to the dotted-line position shown in Fig. 15.

If contrary to the above example the stem-receiving head 50 indexing from station "23" to station "24" is empty, the now closed switch $S_5$ remains closed (line "b" Fig. 14) for the remaining portion of the cycle of operation (i.e. $T_{18}$—$T_{20}$). However, closure of the switch $S_6$ at time $T_3$ (Fig. 14) (while switch $S_5$ remains closed) causes closure of said first circuit and attendant energization of the solenoid 214, thereby causing a roller 226 on an armature 228 of the solenoid 214 to move to the right, as viewed in Figs. 5 and 6, to engage and move the advancing pawl 199 counterclockwise, when viewed in Fig. 5, to disengage the latter from the ratchet wheel 198 and thus prevent indexing of the movable member 22 at station "A" during the interval $T_1$—$T_{16}$ (Fig. 14).

As shown in Fig. 9 the second operating mechanism 46 for the second drive means 34 utilizes a solenoid 236 (Fig. 9) also designated "Sol. 3" in Fig. 1, for disengaging the associated advancing pawl 199 and has a barrel cam (not shown) similar to the cam 208 disposed on the main drive shaft 164 of the sealing and exhaust machine 28. This solenoid 236 has one end of its operating coil (not shown) connected by a conductor 238, Fig. 13, (of a first circuit for preventing the indexing of the movable member 22 at the second index station "B") to the line conductor 224. The other end of its coil is joined by a conductor 240 to one side of a manually operated switch $S_7$ (Fig. 1), the other side of which switch $S_7$ is connected by a conductor to the other line conductor 216.

In order to utilize the movement of the carriage 190 by the movable member 22 for actuating the first and second control means 38 and 44 respectively (Fig. 1) of which the carriage 190 forms a part, a control rod 242 is secured to the forward portion, as viewed in Figs. 1 and 9, of the channel member 188. This control rod 242 engages and closes (under varying conditions of operation of the transfer unit 20) a normally open switch $S_3$ (which is in electrical parallel with switch $S_7$) in a second circuit for interrupting the indexing of the movable member 22 at the second index station "B," a normally-open switch $S_1$ in a first circuit for interrupting the feeding of flares 57 to heads 50 at station "2" of the stem-making machine 26 and a normally-open switch $S_2$ in a second circuit for interrupting the feeding of flares 57 at station "2."

General operation

In order to prepare the lamp-manufacturing apparatus of the present invention for production, which apparatus is assumed to be empty, the carriage 190 is locked to one of the stationary guide channels 197 (Figs. 4 and 9) by manual insertion of a pin 244 into registering holes 246 in channel member 188 and the guide channel 197, thus securing the control rod 242 at position "a" of Fig. 1. This position "a" is 1½ index lengths of the movable member 22 away from the position "b" where the control rod 242 closes the control switch $S_1$ in the first circuit for interrupting the feeding of flares 57 to the stem-making machine 26. It will be understood that an index length of the movable member 22, as hereinafter utilized, means the distance between similar points of reference on adjacent heads 23 thereof.

To further prepare the lamp-manufacturing apparatus for production and to prevent indexing of the movable member 22 at the second index station "B" while the carriage 190 is locked to the guide channel 197, the operator manually closes the normally-open switch $S_7$ (Fig. 1) in the first circuit for preventing indexing of the movable member 22 at the second index station "B" thereby immobilizing the second drive means 34, as hereinafter explained in detail. It is also advisable to prevent needless energization and deenergization of the coil of the solenoid 214 in the first circit for preventing indexing of the movable member 22 at the first index station "A" (which energization is caused by the momentary opening and closing of switch $S_6$ during each stem-making machine index) that the operator simultaneously manually closes a normally-open switch $S_4$ (Fig. 1). This switch $S_4$ is operable when closed to bridge the conductor 222 and the line conductor 216 in the first circuit for preventing indexing of the movable member 22 at the first index station "A," thereby energizing the solenoid 214, disengaging the advancing pawl 199 from the ratchet wheel 198 and immobilizing the first drive means 32.

In order to start the lamp-manufacturing apparatus of the present invention, the motors 56 and 166 for the stem-making machine 26 and the sealing and exhausting machine 28 respectively are energized. The stem-making machine 26 accordingly will receive flares 57, lead wires and exhaust tubes to fabricate the stems 24. When the first stem-fabricating head 50 to which parts have been fed indexes a total of twenty-two times, during which a complete stem 24 will have been formed, thus arriving at station "24," the normally closed switch $S_5$ for detecting stems 24 in the first circuit for preventing indexing of the movable member 22 at the first index station "A," is opened, thus permitting the operator to release the hand switch $S_4$. The stem 24 at station "24" is transferred to a head 23 of the movable member 22, at the first index station "A" by the first transfer device 30 and thereafter the first drive means 32 indexes the movable member 22 at the first index station "A" at the same rate of index as that of the stem-making machine 26.

The first drive means 32 then indexes the stems 24, one by one, along the movable member 22 until the first stem 24 reaches the second index station "B," ready for transfer to the sealing and exhaust machine 28 by the second transfer device 36. The operator first opens the switch $S_7$ to permit the lefthand advancing pawl 199 (Fig. 9) to engage the associated ratchet wheel 198 and then unlocks the carriage 190 from the guide channel member 197 by withdrawal of pin 244 preparatory to the beginning of normal production.

When the stem-making machine 26 has indexed an additional twenty-two times, the sealing and exhausting machine 28 has indexed only 19 times (i.e. in the ratio of $$\frac{1450}{1250} \text{ or } \frac{1.16}{1}$$

thus causing the portion of the movable member 22 intermediate the second index station "B" and the first index station "A" (shown in the upper portion of Fig. 1) to move the carriage 190 toward the lower portion of Fig. 1 a distance indicated by the following formula:

$$\frac{\text{Index length of movable member 22} \times (\text{indexes of stem-making machine 26/unit of time-indexes of sealing and exhaust machine 28/same unit of time})}{2}$$

During this particular carriage movement the control rod 242 on the carriage 190 moves 1½ index lengths $$\left(\text{i.e. } \frac{22-19}{2}\right)$$

from position "a" (Fig. 1), the starting position, to position "b" where the control rod 242 is about to close the normally-open switch $S_1$ in the first circuit for interrupting the feeding of flares 57 to the heads 50 at station "2" of the stem-making machine.

This first circuit for interrupting feeding of flares 57 to the heads 50 includes a conductor 248 extending from one side of the switch $S_1$ to one end of the coil of the solenoid 100 ("Sol. 1" Figs. 1 and 12); conductor 250 connecting the other end of the coil to the line conductor 224; and a conductor 252 joining the other side of the switch $S_1$ to the other line conductor 216.

To prevent undue movement of the carriage 190 in one direction (such as toward the bottom portions of Fig. 1) and permit the slower operating sealing and exhaust machine 28 to "catch up" to the faster stem-making machine 26, the switch $S_1$ is held closed for six indexes of the stem-making machine 26 by a holding mechanism which forms a part of the first control means 38 and is operatively associated with the switch $S_1$. Closure of the switch $S_1$ prevents feeding of flares 57 to six successive heads of the stem-making machine 26. In this holding mechanism a movable contact arm 254 (Fig. 10) of the switch $S_1$ is carried by a first lever 256 pivoted at 257 on a bracket 258. This first lever 256 is spring-biased clockwise against a stop 260 on the bracket 258 and a holding cam 262 is mounted on a second lever 264 pivoted at 257. To provide means for adjusting the angular disposition of the holding cam 262 with respect to the path of movement of the control rod 242 an adjustable stop 266 is mounted on the first lever 256 and the first and second levers are spring biased together so that the stop 266 engages the second lever 264.

Figure 10:
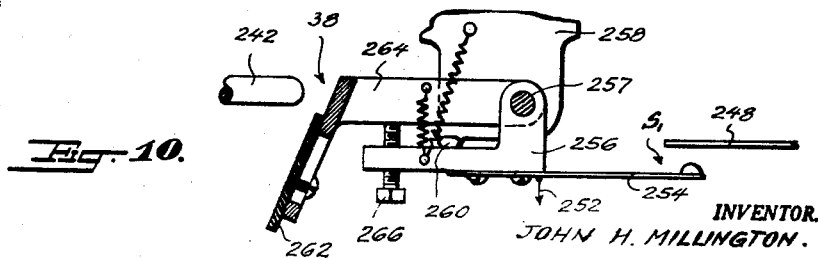
Fig. 10 is an enlarged plan view, partly in cross-section, of a control rod on the carriage of the transfer unit, and showing a first normally open switch for causing the interruption of the feeding of the flares to said stem-making machine and an associated holding cam.

As the control rod 242 engages the holding cam 262, the first lever 256 and second lever 264 are swung counterclockwise, as viewed in Fig. 10, until the holding cam 262 is approximately parallel to the direction of movement of the control rod 262 and the switch $S_1$ is closed, thus energizing the coil of the solenoid 100, locking the restraining rod 88 in the leading flare 57 on the chute 68 of the flare-feeding device 58 and preventing further feeding of flares 57 to the stem-making machine 26 for six indexes of the latter.

To insure closure of the first circuit for preventing feeding of flares 57 to the stem-making machine 26 for six indexes of the latter, the control rod 242 slides along the holding cam 262 for a distance equal to 0.4 index length $$\left(\text{i.e. } \frac{6.0-5.2}{2}\right)$$

of the movable member 22. Thereafter when the control rod 242 slides off the holding cam 262, the first lever 256 and the second lever 264 are retracted by the spring biasing thereof to the position shown in Fig. 10 and the switch $S_1$ is opened whereupon the feeding of flares 57 to the stem-making machine 26 is resumed.

During the twenty-two indexes of the stem-making machine 26 in which the first of the six empty stem-fabricating heads 50 move from station "2" to station "24," the control rod 242 moves 1.5 index lengths $$\left(\text{i.e. } \frac{22-19}{2}\right)$$

from position "b" (Fig. 1) to position "c," which is 3.0 index lengths from starting position "a."

When the first of these six empty stem-fabricating heads 50 of the stem-making machine 26 indexes into station "24" thereof, the detecting switch $S_5$ remains closed (since there are no stems in the heads 50 to open such switch) and upon closure of the switch $S_6$ by the cam 220 at time $T_3$ (Fig. 14), the coil (not shown) of the solenoid 214 (Figs. 1, 5 and 6) is energized and remains energized for six indexes of the stem-making machine 26, thus disconnecting the pawl 199 (Fig. 5) and preventing indexing of the movable member 22 at the first index station "A" during these six indexes of the stem-making machine. Meanwhile the second drive means 34 continues to index the movable member 22 at the second index station "B" for 5.2 indexes $$\left(\text{i.e. } \frac{1}{1.16} \times 6.0\right)$$

and the portion of the movable member 22 intermediate the stations "A" and "B" (shown in the lower portion of Fig. 1) moves the carriage 190 and the control rod 242 upwardly, as viewed in Fig. 1, 2.6 index lengths $$\left(\text{i.e. } \frac{5.2}{2}\right)$$

of the movable member 22, from position "c" (Fig. 1) to the position "d" shown in Fig. 1, which position "d" is 0.4 index lengths (i.e. 1.5+1.5—2.6) below the starting position "a." Thereafter, under normal operating conditions the above described operation of the transfer unit 20, which operation automatically compensates for the difference in the rate of indexing of the movable member 22 at the first and second index stations "A" and "B," is repeated.

Assume that for some reason the sealing and exhaust machine 28 should stop when the control rod 242 is, for example, at position "c" (Fig. 1), it is desirable to provide, as a further portion of the first control means 38, the hereinbefore mentioned mechanism 46 for terminating the interruption of the feeding of flares 57 to the stem-making machine 26. This mechanism 46 latches in the closed position, a normally-open switch $S_2$ in a second circuit for interrupting the further feeding of flares 57 to the stem-making machine 26. In addition this mechanism will permit the final fabrication of the stem parts already in process on the machine 26 and also will thereafter trip the latched switch $S_2$ and permit resumption of normal operations after the sealing and exhausting machine 28 resumes operation.

This second circuit for interrupting the feeding of flares 57 to a stem-fabricating head 50 of the stem-making machine 26 at station "2" thereof extends from one side of the switch $S_2$ through a conductor 268 to the conductor 252 which it will be remembered extends to the line conductor 216, with such circuit also including a conductor 270 connecting the other side of the switch $S_2$ to the conductor 248 which extends to one side of the coil (not shown) of the solenoid 100 (Figs. 1 and 12) thus placing switch $S_2$ in electrical parallel with switch $S_1$.

To provide latching means in the above-mentioned mechanism (Figs. 1 and 11), a movable arm 272 of the switch $S_2$ is secured to a first lever 274 pivoted at 276 on a bracket 278. A second lever 280 engageable by the control rod 242 is also pivoted at 276 and spring biased into engagement with an adjustable stop 282 on the first lever, which stop 282 determines the angular disposition of the lever 280 with respect to the path of movement of the control rod 242. As the control rod 242 moves from position "b" to position "c" of Fig. 1, the control rod 242 moves the levers 274 and 280 counterclockwise, as viewed in Fig. 11, from the solid-line position to the dotted-line position shown therein to close and latch the switch $S_2$, thereby interrupting feeding of flares 57 at station "2." This movement of the levers 274 and 280 causes similar movement of a similar first lever 284 and second lever 285 of a tripping means, which levers 284 and 285 are pivoted at 286. The first lever 284 is connected to the latching means by a rod 288 and carries an adjustable stop 292 which is spring-biased into engagement with the second lever 285 to determine the angular disposition of the second lever 285 with respect to the path of movement of the control rod 242 and hence the release of the now closed switch $S_2$. During the next twenty-two indexes of the stem-making machine 26 and resultant 11 index lengths movement of the control rod 242 from position "c" to position "e" (Fig. 1), the switch $S_2$ remains latched and closed.

Adjacent position "f" the control rod 242 carried by the carriage 190 engages the second lever 285. The control rod 242 moves this second lever 285 of the tripping means counterclockwise from the upper dotted-line position shown in Fig. 11 to the lower dotted-line position shown therein and slides off the latter without disturbing the latched closed switch $S_2$. The control rod 242 is then moved by the carriage 190 beyond position "f" until the last stem 24 has been transferred from a head 50 at station "24" of the stem-making to the movable member 22 at the first index station "A" and the control rod 242 has reached position "e," 11 index lengths $$\left(\text{i.e. } \frac{22}{2}\right)$$

beyond position "c" (Fig. 1). Thereafter the switch $S_5$ (Figs. 1 and 15) will remain closed as empty heads 50 index into station "24" and first circuit for preventing indexing of the movable member 22 at the first index station "A" remains energized, thus preventing further movement of the carriage 190 and the control rod 242.

When the sealing and exhaust machine 28 resumes operation, the second drive means 34 associated therewith resumes indexing of the movable member 22 at the second index station "B" with resultant movement of the carriage 190 and the control rod 242 from position "e" to position "f" (Fig. 1). Adjacent position "f" control rod 242 moves both the second lever 285 and the first lever 284 of the tripping means in clockwise direction from the upper dotted-line position shown in Fig. 11 to the solid line position shown therein. This clockwise movement of the levers 285 and 284 causes downward movement of rod 288 causing similar clockwise movement of the first and second levers 274 and 280 of the latching means, thereby unlatching and opening the switch $S_2$ to permit the resumption of the feeding of flares 57 to the stem-making machine 26 and the subsequent resumption of the transfer of stems 24 from the stem-making machine 26 to the movable member 22 at the first index station "A" thereof by the first transfer device 30 after the next twenty-two indexes of the stem-making machine 26. During these twenty-two indexes the carriage 190 and the control rod 242 have moved 9½ index lengths $$\left(\text{i.e. } \frac{19}{2}\right)$$

from position "f" (Fig. 1) to position "d" and normal operation, mentioned above, commences again.

Assume further, for example, that the stem-making machine 26 stops while the control rod 242 is in the starting position "a" (Fig. 1). The carriage 190 and the control rod 242 are moved by the portion of the movable member 22 intermediate the first and second index stations "A" and "B," which portion is now driven by the second drive means 34, from position "a" to position "g." Adjacent position "g" the control rod 242 closes the normally open switch $S_3$ in the second circuit for interrupting the indexing of the movable member 22 at the second index station "B." This switch $S_3$ forms a part of the aforementioned second control means 44 for the second operating mechanism 46.

This switch $S_3$ in the second circuit for interrupting the indexing of the movable member 22 at the second index station "B" is connected in parallel with the now open switch $S_7$ by suitable conductors 294 and 296 (Fig. 1). Hence closure of the switch $S_3$ causes energization of the coil (not shown) of the solenoid 236 (Sol. "3" in Fig. 1) with attendant disengagement of its associated advancing pawl 199 (Fig. 9) of the second drive means 34 from its associated ratchet wheel (corresponding to the ratchet 198 shown in Fig. 5). This disengagement of the advancing pawl interrupts the indexing of the movable member 22 at the second index station "B," until such time as the stem-making machine 26 resumes operation and effects movement of the control rod 242 from position "g" toward position "a" to open the switch $S_3$ and permit normal operation of the sealing and exhaust machine 28 to resume.

It will be recognized that the objects of the invention have been achieved by the provision of an automatic transfer unit for transferring work pieces from one machine to another and, more particularly, between non-synchronous automatic incandescent or discharge lamp manufacturing machines.

While in accordance with the patent statutes one best known embodiment of the invention has been illustrated and described in detail, it is to be particularly understood that the invention is not limited thereto or thereby.

I claim:

1. An article feeding, transferring, and receiving apparatus comprising an article feeding unit and an article receiving unit, a transfer unit for transferring articles from said article feeding unit to said article receiving unit, said transfer unit comprising a movable member operative between said article feeding and receiving units, a first means operable to cause movement of one portion of said movable member to a first index position adjacent said article feeding unit, and a second means operable to cause movement of a second portion of said movable member to a later index position adjacent said article receiving unit without interfering with the movement of said movable member to its first index position, said movable member having a portion of varying length intermediate said first index position and said later index position to compensate for any difference in the rate of movement of said two portions of said movable member.

2. An article feeding, transferring, and receiving apparatus comprising an article feeding unit and an article receiving unit, a transfer unit for transferring articles from said article feeding unit to said article receiving unit, said transfer unit comprising a reciprocable carriage operative between said article feeding and receiving units, a continuous member partly carried by said carriage, a first means operable to cause intermittent movement of one portion of said continuous member to a first index position adjacent said article feeding unit, and a second means operable to cause movement of a second portion of said continuous member to a later index position adjacent said article receiving unit without interfering with the intermittent movement of said continuous member to its first index position, said carriage being reciprocable to permit one of the portions intermediate said first index position and said later index position to elongate and the other intermediate portion to shorten to compensate for any difference in the rate of movement of said two portions of said movable member.

3. An article feeding, transferring, and receiving apparatus comprising an article feeding unit, an article receiving unit, a transfer unit for transferring articles from said article feeding unit to said article receiving unit, said transfer unit comprising a reciprocable carriage operative between said article feeding and receiving units, a movable member partly carried by said carriage and movable with respect to said carriage, a first drive means for moving a first portion of said movable member at a rate to receive articles from said article feeding unit, a transfer device for transferring articles from said article feeding unit to said first portion of said movable member, a second transfer device for transferring articles from a second portion of said movable member to said article receiving unit, a second drive means for moving said second portion of said movable member at a rate to discharge articles to said article receiving unit, and said carriage being reciprocable by the two portions of the movable member intermediate said first and second portions of said movable member as they lengthen and shorten to compensate for any difference in the rate of movement of said first and second portions of said movable member.

4. An article feeding, transferring and receiving apparatus comprising an article feeding unit, an article receiving unit, a transfer unit for transferring articles from said article feeding to said article receiving unit, said transfer unit comprising a reciprocable carriage operative between said article feeding and receiving units and having a pair of guide members disposed in spaced relation on said carriage and a continuous movable member passing around and partly supported by said guide members, a first drive means for moving a first portion of said movable member at a rate to receive articles from said article feeding unit, a transfer device for transferring articles from said article feeding unit to said first portion of said movable member, a second transfer device for transferring articles from a second portion of said movable member to said article receiving unit, a second drive means for moving said second portion of said movable member at a rate to discharge articles to said article receiving unit, and said carriage being reciprocable by the two portions of the movable member intermediate said first and second portions of said movable member as they lengthen and shorten to compensate for any difference in the rate of movement of said first and second portions of said movable member.

5. An article feeding, transferring, and receiving apparatus comprising an article feeding unit, an article receiving unit, a transfer unit for transferring articles from said article feeding unit to said article receiving unit, said transfer unit comprising a reciprocable carriage operative between said article feeding and receiving units, a movable member partly carried by said carriage and movable with respect to said carriage, a first drive means for moving a first portion of said movable member at a rate to receive articles from said article feeding unit, a transfer device for transferring articles from said article feeding unit to said first portion of said movable member, a second transfer device for transferring articles from a second portion of said movable member to said article receiving unit, a second drive means for moving said second portion of said movable member at a rate to discharge articles to said article receiving unit, operating mechanism associated with one of said drive means to interrupt its operation, said carriage being reciprocable by the two portions of the movable member intermediate said first and second portions of said movable member as they lengthen and shorten to compensate for any difference in the rate of movement of said first and second portions of said movable member, and control means connected to said operating mechanism and selectively operable by movement of said carriage to interrupt the operation of its associated drive means.

6. An article feeding, transferring, and receiving apparatus comprising an article feeding unit, an article receiving unit, a transfer unit for transferring articles from said article feeding unit to said article receiving unit, said transfer unit comprising a reciprocable carriage operative between said article feeding and receiving units and having a member movable with respect to said carriage, a first drive means for moving a first portion of said movable member at a rate to receive articles from said article feeding unit, operating mechanism associated with said first drive means to interrupt its operation, a transfer device for transferring articles from said article feeding unit to said first portion of said movable member, a second transfer device for transferring articles from a second portion of said movable member to said article receiving unit, a second drive means for moving said second portion of said movable member at a rate to discharge articles to said article receiving unit, a second operating mechanism associated with said second drive means to interrupt its operation, said carriage being reciprocable by the two portions of the movable member intermediate said first and second portions of said movable member as they lengthen and shorten to compensate for any difference in the rate of movement of said two portions of said movable member, and control means connected to both said first mentioned operating mechanism and said second mentioned operating mechanism and selectively operable by movement of said carriage to interrupt the operation of either or both of said drive means.

7. An article feeding, transferring and receiving apparatus comprising a stem feeding unit, a sealing and exhaust unit, a transfer unit for transferring stems from said stem feeding unit to said sealing and exhaust unit, said transfer unit comprising a reciprocable carriage operative between said stem feeding and sealing and exhaust units, a movable member partly carried by said carriage and movable with respect to said carriage, a first drive means for moving a first portion of said movable member at a rate to receive stems from said stem feeding unit, a transfer device for transferring stems from said stem feeding unit to said first portion of said movable member, a second transfer device for transferring stems from a second portion of said movable member to said sealing and exhaust unit, a second drive means for moving said second portion of said movable member at a rate to discharge stems to said sealing and exhaust unit, and said carriage being reciprocable by the two portions of the movable member intermediate said first and second portions of said movable member as they lengthen and shorten to compensate for any difference in the rate of movement of said first and second portions of said movable member.

8. An article feeding, transferring and receiving apparatus comprising a stem feeding unit, a sealing and exhaust unit, a transfer unit for transferring stems from said stem feeding unit to said sealing and exhaust unit, said transfer unit comprising a reciprocable carriage operative between said stem feeding and sealing and exhaust units and having a pair of guide members disposed in spaced relation at opposite ends of said carriage and movable in unison along the axis of reciprocation thereof, a plurality of guide members on each side of its axis of reciprocation, and a continuous member passing around and supported by all of said guide members, said continuous member having means for carrying stems fed by said feeding unit, a first drive means for moving a first portion of said continuous member at a rate to receive stems from said stem feeding unit, an operating mechanism associated with said first drive means to interrupt its operation, a transfer device for transferring stems from said stem feeding unit to said first portion of said continuous member during its movement, a second transfer device for transferring stems from a second portion of said continuous member to said sealing and exhaust unit, a second drive means for moving said second portion of said continuous member at a rate to discharge stems to said sealing and exhaust unit, a second operating mechanism associated with said second drive means to interrupt its operation, said carriage being reciprocable by the two portions of the continuous member intermediate said first and second portions of said movable member as they lengthen and shorten to compensate for any difference in the rate of movement of said first and second portions of said continuous member, control means connected to said first mentioned operating mechanism and selectively operable by said carriage movement to interrupt the operation of said first drive means, and a second control means connected to said second mentioned operating mechanism and operable by movement of said carriage to discontinue the operation of said second drive means.

9. An article feeding, transferring and receiving apparatus comprising an article feeding unit, adapted to feed articles at a predetermined rate, an article receiving unit adapted to receive said articles at the same or at a different predetermined rate, a transfer unit for transferring articles from said article feeding unit to said article receiving unit and comprising a reciprocable carriage operative between said feeding and receiving units and having a pair of guide members disposed in spaced relation on said carriage and a continuous member passing around and supported by said guide members, said continuous member having means thereon for carrying articles fed by said feeding unit, a first drive means for moving a first portion of said continuous member on one side of the axis of reciprocation of said carriage at a rate to receive articles from said article feeding unit, a transfer device disposed between said article feeding unit and said first portion of said continuous member for transferring articles from said article feeding unit to said continuous member, a second drive means for moving a second portion of said continuous member on the opposite side of the axis of reciprocation of said carriage to supply articles to said article receiving unit, said carriage being adapted to be moved along said axis of reciprocation by the two portions of the continuous member intermediate said first and second portions of said continuous member as they lengthen and shorten to compensate for any difference in the rate of movement of said first and second portions of said continuous member, and a second transfer device for transferring articles from said second portion of said continuous member to said article receiving unit.

10. An article feeding, transferring and receiving apparatus comprising an article feeding unit adapted to feed articles at a predetermined rate, an article receiving unit adapted to receive said articles at the same or at a different predetermined rate, a transfer unit for transferring articles from said article feeding unit to said article receiving unit and comprising a reciprocable carriage operative between said feeding and receiving units, a continuous member partly carried by said carriage, said continuous member having means thereon for carrying articles fed by said feeding unit, a first drive means for moving a first portion of said continuous member on one side of the axis of reciprocation of said carriage at a rate to receive articles from said article feeding unit, a transfer device disposed between said article feeding unit and said first portion of said continuous member for transferring articles from said article feeding unit to said continuous member, a second drive means for moving a second portion of said continuous member on the opposite side of the axis of reciprocation of said carriage to supply articles to said article receiving unit, operating mechanism associated with one of said drive means to interrupt its operation, said carriage being adapted to be moved along said axis of reciprocation by the two portions of the continuous member intermediate said first and second portions of said continuous member as they lengthen and shorten to compensate for any difference in the rate of movement of said first and second portions of said continuous member, and a second transfer device for transferring articles from said second portion of said continuous member to said article receiving unit, and control means connected to said operating mechanism and selectively operable by said carriage movement to interrupt the operation of its associated drive means.

11. An article feeding, transferring and receiving apparatus comprising an article feeding unit, adapted to feed articles at a predetermined rate, an article receiving unit adapted to receive said articles at the same or at a different predetermined rate, a transfer unit for transferring articles from said article feeding unit to said article receiving unit and comprising a reciprocable carriage operative between said feeding and receiving units, a continuous member partly carried by said carriage, said continuous member having means thereon for carrying articles fed by said feeding unit, a first drive means for moving a first portion of said continuous member on one side of the axis of reciprocation of said carriage at a rate to receive articles from said article feeding unit, an operating mechanism associated with said first drive means to interrupt its operation, a transfer device disposed between said article feeding unit and said first portion of said continuous member for transferring articles from said article feeding unit to said continuous member, a second drive means for moving a second portion of said continuous member on the opposite side of the axis of reciprocation of said carriage to supply articles to said article receiving unit, a second operating mechanism associated with said second drive means to interrupt its operation, said carriage being adapted to be moved along said axis of reciprocation by the two portions of the continuous member intermediate said first and second portions of said continuous member as they lengthen and shorten to compensate for any difference in the rate of movement of said first and second portions of said continuous member, and a second transfer device for transferring articles from said second portion of said continuous member to said article receiving unit, and control means connected to said first mentioned operating mechanism and selectively operable by said carriage movement to interrupt the operation of said first drive means.

12. A lamp making machine comprising a stem feeding unit adapted to feed stems at a predetermined rate, a sealing and exhaust unit adapted to receive said stems at the same or at a different predetermined rate, a transfer unit for transferring stems from said stem feeding unit to said sealing and exhaust unit and comprising a reciprocable carriage operative between said feeding and receiving units, a continuous member partly carried by said carriage, said continuous member having means thereon for carrying stems fed by said feeding unit, a first drive means for moving a first portion of said continuous member on one side of the axis of reciprocation of said carriage at a rate to receive stems from said stem feeding unit, a transfer device disposed between said stem feeding unit and said first portion of said continuous member for transferring stems from said stem feeding unit to said continuous member, a second drive means for moving a second portion of said continuous member on the opposite side of the axis of reciprocation of said carriage to supply stems to said sealing and exhaust unit, said carriage being adapted to be moved along said axis of reciprocation by the two portions of the continuous member intermediate said first and second portions of said continuous member as they lengthen and shorten to compensate for any difference in the rate of movement of said first and second portions of said continuous member, and a second transfer device for transferring stems from said second portion of said continuous member to said sealing and exhaust unit.

13. A lamp making machine comprising a stem feeding unit adapted to feed stems at a predetermined rate, a sealing and exhaust unit adapted to receive said stems at the same or at a different predetermined rate, a transfer unit for transferring stems from said stem feeding unit to said sealing and exhaust unit and comprising a reciprocable carriage operative between said feeding and sealing and exhaust units and having a pair of guide members disposed in spaced relation on said carriage and movable in unison along the axis of reciprocation thereof, a plurality of other guide members on each side of said axis and a continuous member passing around and supported by said guide members, said continuous member having means thereon for carrying articles fed by said feeding unit, a first drive means for moving a first portion of said continuous member on one side of the axis of reciprocation of said carriage at a rate to receive stems from said stem feeding unit, an operating mechanism associated with said first drive means to interrupt its operation, a transfer device disposed between said stem feeding unit and said first portion of said continuous member for transferring stems from said stem feeding unit to said continuous member, a second drive means for moving a second portion of said continuous member on the opposite side of said axis of reciprocation of said carriage to supply stems to said sealing and exhaust unit, a second operating mechanism associated with said second drive means to interrupt its operation, said carriage being adapted to be moved along said axis of reciprocation by the two portions of the continuous member intermediate said first and second portions of said continuous member as they lengthen and shorten to compensate for any difference in the rate of movement of said first and second portions of said continuous member, and a second transfer device for transferring stems from said second portion of said continuous member to said sealing and exhaust unit, control means connected to said first mentioned operating mechanism and selectively operable by said carriage movement to interrupt the operation of said first drive means, and a second control means connected to said second mentioned operating mechanism and selectively operable by movement of said carriage to interrupt the operation of said second drive means.

14. A transfer unit comprising a reciprocable carriage, a movable member partly carried by said carriage and movable with respect to said carriage, a first drive means for moving a first portion of said movable member at a predetermined rate, and a second drive means for moving a second portion of said movable member at a second predetermined rate, said carriage being reciprocable by the two portions of the movable member intermediate said first and second portions of said movable member as they lengthen and shorten to compensate for any difference in the rate of movement of said first and second portions of said movable member.

15. A transfer unit comprising a reciprocable carriage having a pair of guide members disposed in spaced relation on said carriage and movable in unison along the axis of reciprocation thereof and a plurality of other guide members on each side of said axis, a continuous member passing around and supported by all of said guide members, a first drive means for moving a first portion of said movable member at a predetermined rate, a second drive means for moving a second portion of said movable member at a second predetermined rate, and said carriage being reciprocable by the two portions of the continuous member intermediate said first and second portions of said continuous member as they lengthen and shorten to compensate for any difference in the rate of movement of said first and second portions of said movable member.

16. A transfer unit comprising a reciprocable carriage, a movable member partly carried by said carriage and movable with respect thereto, a first drive means for moving a first portion of said movable member at a predetermined rate, a second drive means for moving a second portion of said movable member at a second predetermined rate, an operating mechanism associated with one of said drive means to interrupt its operation, said carriage being reciprocable by the two portions of the movable member intermediate said first and second portions of said movable member as they lengthen and shorten to compensate for any difference in the rate of movement of said first and second portions of said movable member, and control means connected to said operating mechanism and selectively operable by said carriage movement to interrupt the operation of the faster drive means.

17. A transfer unit comprising a reciprocable carriage, a movable member partly carried by said carriage and movable with respect thereto, a first drive means for moving a first portion of said movable member at a predetermined rate, an operating mechanism associated with said first drive means to discontinue its operation, a second drive means for moving a second portion of said movable member at a second predetermined rate, a second operating mechanism associated with said second drive means to interrupt its operation, said carriage being reciprocable by the two portions of the movable member intermediate said first and second portions of said movable member as they lengthen and shorten to compensate for any difference in the rate of movement of said first and second portions of said movable member, control means connected to said first mentioned operating mechanism and selectively operable by said carriage movement to interrupt the operation of said first drive means, and a second control means connected to said second mentioned operating mechanism and operable by movement of said carriage to interrupt the operation of said second drive means.

18. A transfer unit comprising a reciprocable carriage having a pair of guide members disposed in spaced relation on said carriage and movable along the axis of reciprocation thereof, a plurality of other guide members on each side of said axis and a continuous member passing around and supported by said guide members, said continuous member having means thereon for carrying articles, a first drive means for moving a first portion of said movable member at a predetermined rate, a second drive means for moving a second portion of said movable member at a second predetermined rate, said carriage being reciprocable by the two portions of the continuous member intermediate said first and second portions of said continuous member as they lengthen and shorten to compensate for any difference in the rate of movement of said first and second portions of said movable member.

19. A transfer unit comprising a reciprocable carriage having a pair of guide members disposed in spaced relation on said carriage and movable in unison along the axis of reciprocation thereof, a plurality of other guide members on each side of said axis, and a continuous member passing around and supported by all of said guide members, a first drive means for moving a first portion of said continuous member on one side of said axis of reciprocation of said carriage at a predetermined rate, an operating mechanism associated with said first drive means to interrupt its operation, a second drive means for moving a second portion of said continuous member on the opposite side of said axis of reciprocation of said carriage at a second predetermined rate, a second operating mechanism associated with said second drive means to interrupt its operation, said carriage being reciprocable by the two portions of the continuous member intermediate said first and second portions of said continuous member as they lengthen and shorten to compensate for any difference in the rate of movement of said first and second portions of said continuous member, control means connected to said first mentioned operating mechanism and selectively operable by said carriage movement to interrupt the operation of said first drive means, and a second control means connected to said second mentioned operating mechanism and operable by movement of said carriage to interrupt the operation of said second drive means.

20. A transfer unit comprising a movable member, a first drive means for moving a first portion of said movable member at one predetermined rate, a second drive means for moving a second portion of said movable member at a faster rate than said one predetermined rate, an operating mechanism associated with the second drive means to interrupt its operation, said movable member having a portion of varying length intermediate said first and second portions to compensate for the difference in the rate of movement of said first and second portions of said movable member, and control means connected to said operating mechanism and selectively operable by said movement of said movable member to actuate the operating mechanism and cause interruption of the operation of the second drive means.

21. The combination of a machine operating at a relatively high rate of production, a second machine operating at a relatively low rate of production, a continuous flexible conveyor for conveying articles from one of said machines to the other, means for transferring articles from said one machine to the conveyor and for driving the portion of the conveyor adjacent the point of transfer in synchronization with the operation of said one machine, means for transferring articles from the conveyor to said other machine and for driving the portion of the conveyor adjacent the point of transfer in synchronization with the operation of said other machine, and means responsive to decrease in length of that portion of the conveyor moving from the slower machine to the faster machine for temporarily interrupting transfer of articles between the faster machine and the conveyor and movement of the conveyor adjacent the point at which the last-mentioned transfer takes place.

22. The combination of a machine operating at a relatively high rate of production, a second machine operating at a relatively low rate of production, a continuous flexible conveyor for conveying articles from one of said machines to the other, means for transferring articles from said one machine to the conveyor and for driving the portion of the conveyor adjacent the point of transfer in synchronization with the operation of said one machine, means for transferring articles from the conveyor to said other machine and for driving the portion of the conveyor adjacent the point of transfer in synchronization with the operation of said other machine, means responsive to decrease in length of that portion of the conveyor moving from the slower machine to the faster machine for temporarily interrupting transfer of articles between the faster machine and the conveyor and movement of the conveyor adjacent the point at which the last-mentioned transfer takes place, and means responsive to increase in length of that portion of the conveyor moving from the slower machine to the faster machine to terminate the above-mentioned interruption of transfer of articles between the faster machine and the conveyor and movement of the conveyor adjacent the point at which the last-mentioned transfer takes place.

23. The combination of a machine operating at a relatively high rate of production, a second machine operating at a relatively low rate of production, a continuous flexible conveyor for conveying articles from one of said machines to the other, means for transferring articles from said one machine to the conveyor, means for driving the portion of the conveyor adjacent the point of transfer from said one machine in synchronization with the operation of said one machine, means for transferring articles from the conveyor to said other machine, means for driving the portion of the conveyor adjacent the point of transfer from said other machine in synchronization with the operation of said other machine, and means responsive to decrease in length of that portion of the conveyor moving from the slower machine to the faster machine for temporarily interrupting transfer of articles between the faster machine and the conveyor and movement of the conveyor adjacent the point at which the last-mentioned transfer takes place.

24. The combination of a first machine operating at a relatively high rate of production, a second machine operating at a relatively low rate of production, a reciprocable carriage operative between said first and second machines, a continuous flexible conveyor carried by said carriage for conveying articles from one of said machines to the other, means for transferring articles from said one machine to the conveyor, a first drive means for driving the portion of the conveyor adjacent the point of transfer from said one machine in synchronization with the latter, an operating mechanism associated with said first drive means to interrupt its operation and the transfer of articles from said one machine to said conveyor, means for transferring articles from the conveyor to said other machine, a second drive means for driving the portion of the conveyor adjacent the point of transfer from said other machine in synchronization with the latter, and means responsive to decrease in length of that portion of the conveyor moving from the slower machine to the faster machine for rendering said operating mechanism effective.

25. An article feeding, transferring, and receiving apparatus comprising an article feeding unit and an article receiving unit operating at a slower rate than said article feeding unit, a movable member for transferring articles from said article feeding unit to said article receiving unit, means for moving successive portions of said movable member to a first index station thereof and for transferring articles from said article feeding unit to said movable member at said first index position, means for moving successive portions of said movable member to a second index position and for transferring articles from said movable member at said second index position to said article receiving unit, and means responsive to decrease in the length of that portion of said movable member which is moving from said second index position to said first index position for interrupting movement of said movable member at said first index position and the transfer of articles from said article feeding unit to said movable member.

26. An article feeding, transferring, and receiving apparatus comprising an article feeding unit and an article receiving unit operating at a slower rate than said article feeding unit, a continuous flexible movable conveyor member for transferring articles from said article feeding unit to said article receiving unit, means for moving successive portions of said movable member to a first index position thereof, means for transferring articles from said article feeding unit to said movable member at said first index position, means for moving successive portions of said movable member to a second index position, means for transferring articles from said movable member at said second index position to said article receiving unit, and means responsive to decrease in the length of that portion of said movable member which is moving from said second index position to said first index position for interrupting movement of said movable member at said first index position and the transfer of articles from said article feeding unit to said movable member.

27. An article feeding, transferring, and receiving apparatus comprising an article feeding unit and an article receiving unit operating at a slower rate than said article feeding unit, a continuous flexible movable conveyor member for transferring articles from said article feeding unit to said article receiving unit, means for moving successive portions of said movable member to a first index position thereof and for transferring articles from said article feeding unit to said movable member at said first index position, means for moving successive portions of said movable member to a second index position and for transferring articles from said movable member at said second index position to said article receiving unit, means responsive to decrease in the length of that portion of said movable member which is moving from said second index position to said first index position for interrupting movement of said movable member at said first index position and the transfer of articles from said article feeding unit to said movable member, and means responsive to decrease in the length of that portion of said movable member which is moving from said first index position to said second index position to terminate the above-mentioned interruption of movement of said movable member at said first index position and the transfer of articles from said article feeding unit to said movable member.

28. An article feeding, transferring, and receiving apparatus comprising an article feeding unit and an article receiving unit operating at a slower rate than said article feeding unit, a pair of guide members disposed in spaced relation, a continuous flexible movable conveyor member passing around and supported by said guide members for transferring articles from said article feeding unit to said article receiving unit, means for moving successive portions of said movable member to a first index position thereof, means for transferring articles from said article feeding unit to said movable member at said first index position, means for moving successive portions of said movable member to a second index position, means for transferring articles from said movable member at said second index position to said article receiving unit, and means responsive to movement of one of said guide members upon decrease in the length of that portion of said movable member which is moving from said second index position to said first index position for interrupting movement of said movable member at said first index position and the transfer of articles from said article feeding unit to said movable member.

29. An article feeding, transferring and receiving apparatus comprising an article feeding unit and an article receiving unit operating at a slower rate than said article feeding unit, a reciprocable carriage operative between said article feeding and receiving units and having a continuous flexible movable conveyor member for transferring articles from said article feeding unit to said article receiving unit, a first drive means for moving successive portions of said movable member to a first index position thereof, means for transferring articles from said article feeding unit to said movable member at said first index position, a first operating mechanism associated with said first drive means to interrupt its operation and the transfer of articles from said article feeding unit to said movable member, a second drive means for moving successive portions of said movable member to a second index position, means for transferring articles from said movable member at said second index position to said article receiving unit, a second operating mechanism associated with said second drive means to interrupt its operation and the transfer of articles from said movable member to said article receiving unit, a first control means associated with said first operating mechanism and responsive to movement of said carriage upon decrease in length of that portion of said movable member which is moving from said second index position to said first index position for actuating said first operating mechanism, and a second control means associated with said second operating mechanism and responsive to decrease in the length of that portion of said movable member which is moving from said first index position to said second index position for actuating said second operating mechanism.

30. The combination of a machine operating at a relatively high rate of production and comprising a rotating turret, means for feeding elements onto said turret at a first index station thereof, a second machine operating at a relatively low rate of production, a continuous flexible conveyor for conveying articles from said first machine to said second machine, means for transferring articles from said turret at a later index station thereof to said conveyor, means for driving the portion of said conveyor adjacent said first machine in synchronism with said turret, means responsive to absence of an article on said turret at said later index station for temporarily interrupting movement of the portion of said conveyor adjacent said first machine, means for transferring articles from said conveyor to said second machine, means for driving the portion of said conveyor adjacent said second machine in synchronism with said second machine, and means responsive to movement of the portion of said conveyor adjacent said first machine relative to movement of the portion of said conveyor adjacent said second machine for temporarily interrupting feeding of elements onto said turret at said first index station thereof, and attendant interruption of both transfer of articles to said conveyor and also movement of the portion of said conveyor adjacent said first machine.

31. The combination of a first machine operating at a relatively high rate of production and comprising a rotating turret, means for feeding elements onto said turret at a first index station thereof, a second machine operating at a relatively low rate of production, a reciprocable carriage operative between said first and second machines, a continuous flexible movable member partly carried by said carriage for conveying articles from said first machine to said second machine, means for transferring articles from said turret at a later index station thereof to said movable member, a first drive means for driving the portion of said movable member adjacent said first machine in synchronism with said turret, detecting means adjacent said later index station for detecting the absence of an article on said turret at said later index station, a first operating mechanism associated with said first drive means to interrupt the operation of said first drive means and actuated by said detecting means, means for transferring articles from said movable member to said second machine, a second drive means for driving the portion of said movable member adjacent said second machine in synchronism with said second machine, a second operating mechanism associated with said second drive means to interrupt its operation, a first control means associated with said element feeding means and responsive to movement of said carriage due to movement of the portion of said movable member adjacent said first machine relative to movement of the portion of said movable member adjacent said second machine for temporarily interrupting feeding of elements onto said turret at said first index station thereof, a second control means associated with said first operating mechanism and responsive to movement of said carriage due to movement of the portion of said movable member adjacent said first machine relative to movement of the portion of said movable member adjacent said second machine to actuate said first operating mechanism, a third control means associated with said second operating mechanism and responsive to movement of said carriage due to movement of the portion of said movable member adjacent said first machine relative to movement of the portion of said movable member adjacent said second machine to actuate said second operating mechanism, and means responsive to movement of said carriage due to movement of the portion of said movable member adjacent said first machine relative to movement of the portion of said movable member adjacent said second machine to terminate the above-mentioned interruption of feeding of elements onto said turret at said first index station thereof.

References Cited in the file of this patent

UNITED STATES PATENTS 2,551,080     Allen et al. _____ May 1, 1951